(12) United States Patent
Tanaka et al.

(10) Patent No.: US 11,022,172 B2
(45) Date of Patent: Jun. 1, 2021

(54) ROLLING BEARING DEVICE AND ASSEMBLING METHOD FOR THE SAME

(71) Applicant: JTEKT CORPORATION, Osaka (JP)

(72) Inventors: Yui Tanaka, Kashiwara (JP); Kazuhiro Kimura, Higashiosaka (JP); Masaaki Ohtsuki, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/806,380

(22) Filed: Mar. 2, 2020

(65) Prior Publication Data

US 2020/0284295 A1 Sep. 10, 2020

(30) Foreign Application Priority Data

Mar. 5, 2019 (JP) .............................. JP2019-039764

(51) Int. Cl.
| | |
|---|---|
| *F16C 19/08* | (2006.01) |
| *F16C 33/30* | (2006.01) |
| *F16C 35/06* | (2006.01) |
| *F16C 43/04* | (2006.01) |
| *F16C 33/58* | (2006.01) |
| *F16C 35/067* | (2006.01) |

(52) U.S. Cl.
CPC ............ *F16C 19/08* (2013.01); *F16C 33/583* (2013.01); *F16C 35/067* (2013.01); *F16C 43/04* (2013.01)

(58) Field of Classification Search
CPC ...... F16C 19/08; F16C 33/583; F16C 35/061; F16C 35/067; F16C 43/04; F16C 2226/50; F16C 2226/76; F16C 2240/40

USPC ........ 384/504, 513, 517, 520, 539, 561, 903
See application file for complete search history.

(56) References Cited

U.S. PATENT DOCUMENTS

| | | | | | |
|---|---|---|---|---|---|
| 1,335,040 | A | * | 3/1920 | Burrows | ............... B60K 17/165 384/540 |
| 3,722,374 | A | * | 3/1973 | Densmore | ............... F16B 21/18 92/128 |
| 4,549,823 | A | * | 10/1985 | Nichting | ............... F16C 27/066 384/537 |
| 7,377,695 | B2 | * | 5/2008 | Qiu | ........................ H01J 35/101 384/504 |
| 9,174,665 | B2 | * | 11/2015 | Aizawa | .................. F16C 33/108 |
| 10,451,107 | B2 | * | 10/2019 | Ehrhard | .................. F16C 33/58 |

(Continued)

FOREIGN PATENT DOCUMENTS

| | | | | | |
|---|---|---|---|---|---|
| CN | 103328867 | A | * | 9/2013 | ............... F16J 9/062 |
| CN | 104876302 | A | * | 9/2015 | ............... C02F 1/44 |
| CN | 105332115 | A | * | 2/2016 | ............... D01H 1/00 |

(Continued)

*Primary Examiner* — Marcus Charles
(74) *Attorney, Agent, or Firm* — Oliff PLC (57) ABSTRACT

A rolling bearing device includes a rotary shaft; a housing; a pair of rolling bearings; an outer ring spacer; an elastic member provided in a bottom side of the housing, the bottom side of the housing being a second axial side of the housing, and the elastic member being configured to urge the rolling bearings, the outer ring spacer, and the rotary shaft toward a first axial side; and a retaining ring that is fitted into a circumferential groove provided on an inner periphery in the first axial side of the housing, the retaining ring being in axial contact with the outer ring of the rolling bearing located on the first axial side, and the retaining ring including at least three arc members arranged in a circumferential direction.

4 Claims, 11 Drawing Sheets

(56) References Cited

U.S. PATENT DOCUMENTS

| | | | | |
|---|---|---|---|---|
| 10,550,888 B2 * | 2/2020 | Yamada | ............. | F16C 33/3887 |
| 2015/0078696 A1 * | 3/2015 | Schmidt | ................ | F16C 19/181 |
| | | | | 384/504 |

FOREIGN PATENT DOCUMENTS

| | | | | | |
|---|---|---|---|---|---|
| CN | 103459870 B | * | 5/2017 | ............ | F16C 33/586 |
| JP | H07-085824 A | | 3/1995 | | |
| JP | 11325062 A | * | 11/1999 | ............ | F16C 33/605 |
| JP | 2006261096 A | * | 9/2006 | ............ | H01J 35/101 |
| JP | 4058568 B2 | * | 3/2008 | ............... | F16C 43/04 |
| JP | 2013134915 A | * | 7/2013 | | |
| JP | 2018013230 A | * | 1/2018 | | |
| WO | WO-2014061340 A1 | * | 4/2014 | ............ | H01J 35/101 |
| WO | WO-2016063980 A1 | * | 4/2016 | ............... | F16C 33/82 |

\* cited by examiner

ROLLING BEARING DEVICE AND ASSEMBLING METHOD FOR THE SAME

CROSS-REFERENCE TO RELATED APPLICATION

This application claims priority to Japanese Patent Application No. 2019-039764 filed on Mar. 5, 2019, incorporated herein by reference in its entirety.

BACKGROUND

1. Technical Field

The disclosure relates to a rolling bearing device and an assembling method for the rolling bearing device.

2. Description of Related Art

In an X-ray tube used in a medical X-ray apparatus, X-rays are emitted by radiating an electron beam onto a target made of tungsten or the like. The temperature of the target increases when the target is irradiated with the electron beam. The target is rotated to disperse an irradiation position of the electron beam and restrain the temperature rise of the target. Thus, the X-ray tube is provided with a rolling bearing device including a rotary shaft that rotates with the target (see, for example, Japanese Unexamined Patent Application Publication No. 7-85824).

SUMMARY

A rolling bearing device for an X-ray tube includes a rotary shaft having at its end a flange portion to which the target is attached, a bottomed cylindrical housing that houses a shaft body portion of the rotary shaft, and a pair of rolling bearings provided in the housing and supporting the rotary shaft such that the rotary shaft is rotatable. A cylindrical outer ring spacer is provided between the outer rings of the pair of rolling bearings. A spring is provided in a bottom side of the housing so as to push the outer ring of the rolling bearing on the bottom side toward an opening of the housing. Thus, the outer ring spacer and the outer ring of the rolling bearing on the opening side also receive a force in the same direction (axial force). A C-shaped retaining ring is provided in the opening side of the housing. The retaining ring is fitted into a circumferential groove provided on an inner periphery of the housing. The outer ring of the rolling bearing on the opening side is further urged toward the opening by the spring, and the outer ring is positioned by the retaining ring.

Figure 11:
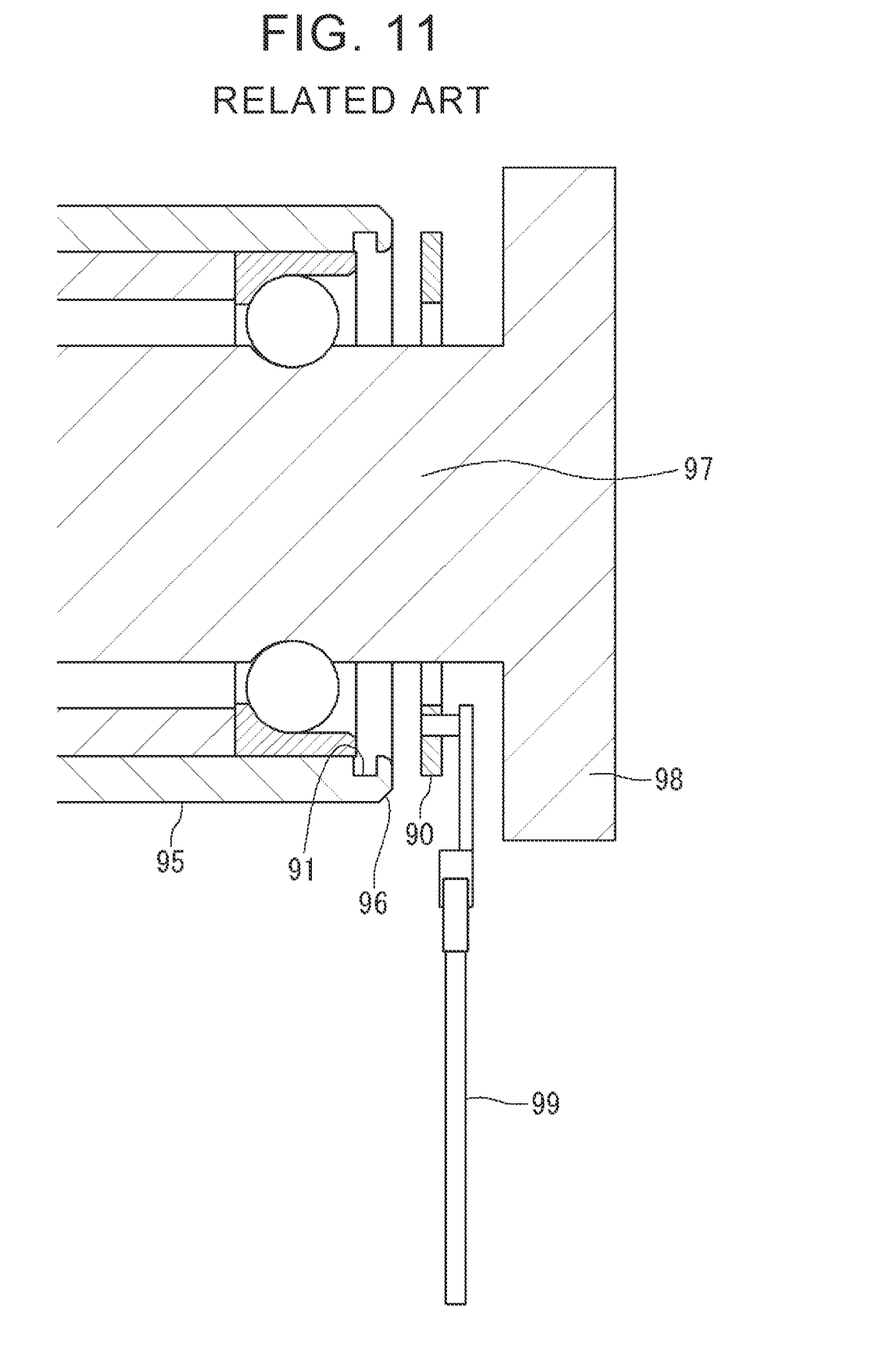
FIG. 11 is an explanatory diagram of an assembling method for the rolling bearing device in related art.

An assembling method for the rolling bearing device having the above configuration is as follows. The spring and the rotary shaft to which the rolling bearings and the outer ring spacer are assembled are inserted in the housing, and then a retaining ring 90 is fitted into a circumferential groove 91 of a housing 95 as shown in FIG. 11. To fit the retaining ring 90 into the circumferential groove 91, it is necessary to use a tool (plier) 99 to hold the C-shaped retaining ring 90, elastically deform the retaining ring 90 in a direction in which its diameter is reduced, and fit the retaining ring 90 into the circumferential groove 91 through a clearance between an end portion 96 in the opening side of the housing 95 and a flange portion 98 of a rotary shaft 97. Further, at this time, it is necessary to maintain a state where the rotary shaft 97 is pushed to the bottom side (left side in FIG. 11) against the urging force of the spring.

The clearance between the end portion 96 in the opening side of the housing 95 and the flange portion 98 of the rotary shaft 97 is narrow. In addition, when fitting the retaining ring 90 into the circumferential groove 91, sufficient caution is required so as not to damage the retaining ring 90 and other parts. Thus, the operation of fitting the retaining ring 90 into the circumferential groove 91 is very difficult.

The disclosure provides a rolling bearing device that facilitates an operation of fitting a retaining ring into a circumferential groove of a housing, and an assembling method for the rolling bearing device.

A first aspect of the disclosure relates to a rolling bearing device. The rolling bearing device includes a rotary shaft including a shaft body portion and a flange portion provided closer to a first axial side than the shaft body portion is; a housing having a bottomed cylindrical shape, the housing being configured to house the shaft body portion; a pair of rolling bearings provided in the housing so as not to be axially movable with respect to the rotary shaft, the rolling bearings being configured to support the rotary shaft such that the rotary shaft is rotatable; an outer ring spacer interposed between outer rings of the rolling bearings; an elastic member provided in a bottom side of the housing, the bottom side of the housing being a second axial side of the housing, and the elastic member being configured to urge the rolling bearings, the outer ring spacer, and the rotary shaft toward the first axial side; and a retaining ring that is fitted into a circumferential groove provided on an inner periphery in the first axial side of the housing, the retaining ring being in axial contact with the outer ring of the rolling bearing located on the first axial side, and the retaining ring including at least three arc members arranged in a circumferential direction.

In the rolling bearing device, after the elastic member, the rolling bearings, the outer ring spacer, and the rotary shaft are housed in the housing, the rotary shaft is pushed toward the second axial side against the urging force of the elastic member, and in this state, the retaining ring is fitted into the circumferential groove. At the time of fitting the retaining ring into the circumferential groove, the arc members are overlapped and fitted into the circumferential groove. Then, with respect to one arc member, the other arc member is moved in the circumferential direction. Thus, the arc members can be arranged in an annular shape and function as the retaining ring. Since assembly can be performed in this way, it is not necessary to elastically deform the retaining ring in a direction in which its diameter is reduced, unlike in the related art. This facilitates the operation of fitting the retaining ring into the circumferential groove, and as a result, facilitates the assembly of the rolling bearing device.

An axial width dimension of the circumferential groove may be larger than twice a thickness of each of the arc members, and smaller than three times the thickness of each of the arc members. With the above configuration, two arc members are overlapped and fitted into the circumferential groove, and the operation of moving, with respect to one arc member, the other arc member in the circumferential direction is performed. This can restrain the axial width dimension of the circumferential groove from becoming unnecessarily large.

The arc members may include one arc member and other arc members that are regarded as one set, and a linear distance between corners of the one arc member on both ends along an outer periphery of the one arc member may be larger than a linear distance between corners of the one set on both ends along an inner periphery of the one set. With the above configuration, even when the axial force applied by the elastic member is weakened and the one arc member is prone to be displaced toward the center line, for example, the both end surfaces of the one arc member in the circumferential direction come into contact with the other arc members on both sides of the one arc member in the circumferential direction. Therefore, it is possible to restrain the one arc member from falling off from the circumferential groove.

End surfaces of the arc members in the circumferential direction may have recessed and projected shapes, and the recessed and projected shapes of the end surfaces of the arc members adjacent in the circumferential direction may mesh with each other. With the above configuration, even when the axial force applied by the elastic member is weakened and the one arc member is prone to be displaced toward the center line, for example, the both end surfaces (with the recessed and projected shapes) of the one arc member in the circumferential direction come into contact with the end surfaces (with the recessed and projected shapes) of the arc members adjacent to the one arc member in the circumferential direction. Therefore, it is possible to restrain the one arc member from being largely displaced toward the center, that is, falling off from the circumferential groove.

A second aspect of the disclosure relates to an assembling method for the rolling bearing device. The assembling method includes housing the elastic member, the rolling bearings, the outer ring spacer, and the rotary shaft in the housing; and fitting the retaining ring into the circumferential groove in a state where the rotary shaft is pushed toward the second axial side against an urging force of the elastic member. Fitting the retaining ring into the circumferential groove includes i) inserting at least two of the arc members in the circumferential groove such that the at least two arc members overlap each other, and then moving, with respect to one of the at least two arc members, a rest of the at least two arc members in the circumferential direction, and ii) arranging the at least three arc members in an annular shape. According to this method, the retaining ring can be fitted into the circumferential groove without the need to elastically deform the retaining ring in a direction in which its diameter is reduced as in the related art, which facilitates the assembly of the rolling bearing device.

In the rolling bearing device according to the above aspect of the disclosure, the operation of fitting the retaining ring into the circumferential groove of the housing is facilitated, and as a result, the assembly of the rolling bearing device is facilitated. According to the assembling method of the rolling bearing device according to the above aspect of the disclosure, the retaining ring can be fitted into the circumferential groove without the need to elastically deform the retaining ring in the direction in which its diameter is reduced, unlike in the related art. Therefore, the assembly of the rolling bearing device is facilitated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
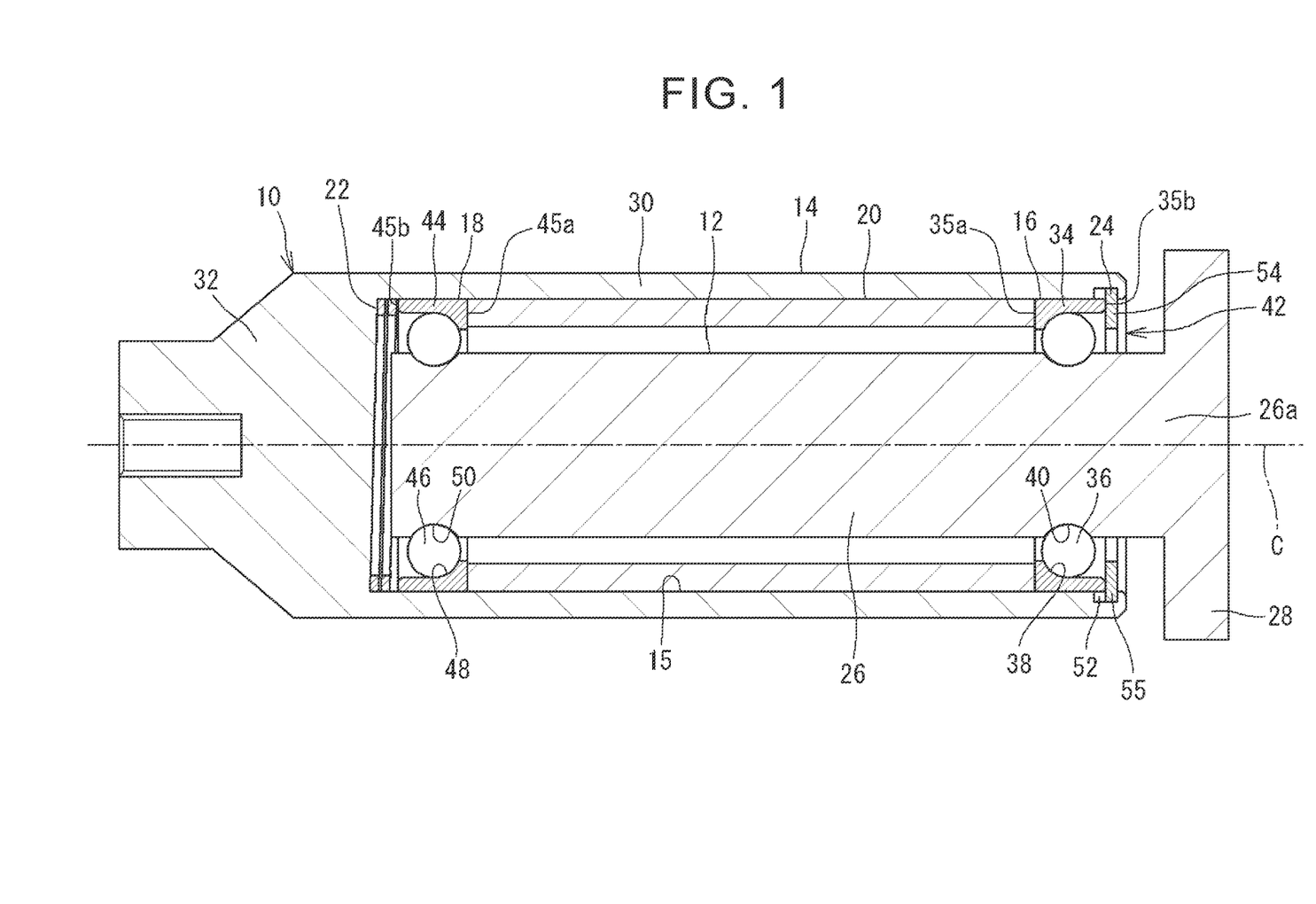
FIG. 1 is a sectional view showing an example of a rolling bearing device.

FIG. 1 is a sectional view showing an example of a rolling bearing device. A rolling bearing device 10 is a device for an X-ray tube used in a medical X-ray apparatus. Although not shown in FIG. 1, the X-ray tube includes a vacuum container, a target made of tungsten or the like, and an electron gun. An electron beam is radiated from the electron gun to the target provided in the vacuum container such that an X-ray is emitted from the target. The temperature of the target increases by being irradiated with the electron beam. The target is rotated to disperse an irradiation position of the electron beam and restrain a temperature rise of the target. Therefore, the X-ray tube is provided with the rolling bearing device 10 shown in FIG. 1.

The rolling bearing device 10 includes a rotary shaft 12, a housing 14, a pair of rolling bearings 16, 18, an outer ring spacer 20, an elastic member 22, and a retaining ring 24. The housing 14 is a bottomed cylindrical member. A direction extending along a center line C of the housing 14 is defined as an "axial direction of the rolling bearing device 10", and is simply referred to as the "axial direction". A direction parallel to the center line C is included in this axial direction. A direction orthogonal to the center line C is a "radial direction of the rolling bearing device 10", and is simply referred to as the "radial direction". A direction in which the rotary shaft 12 rotates around the center line C is a "circumferential direction of the rolling bearing device 10", and is simply referred to as the "circumferential direction". The right side in FIG. 1 is defined as a first axial side, and the left side in FIG. 1 is defined as a second axial side.

The rotary shaft 12 includes a linear shaft body portion 26 and a flange portion 28 provided on the first axial side relative to the shaft body portion 26 (in other words, a flange portion 28 provided closer to the first axial side than the shaft body portion 26 is). The flange portion 28 has a disc shape that spreads (extends) radially outward from an end portion 26a of the shaft body portion 26. The housing 14 includes a cylindrical tube portion 30 and a bottom portion 32 provided on the second axial side relative to the tube portion 30 (in other words, a bottom portion 32 provided closer to the second axial side than the tube portion 30 is). The shaft body portion 26 is housed in a space defined between the tube portion 30 and the bottom portion 32.

The first rolling bearing 16 on the first axial side includes an outer ring 34 and balls (rolling elements) 36. An outer raceway surface 38 is provided on an inner periphery of the outer ring 34. The balls 36 are in rolling contact with the outer raceway surface 38. The outer ring 34 is fitted to an inner peripheral surface 15 of the housing 14 with a (small) gap therebetween. In the present embodiment, an inner raceway surface 40 is directly provided on an outer periphery of the rotary shaft 12. The balls 36 are in rolling contact with the inner raceway surface 40. Thus, the rolling bearing 16 is provided in the housing 14 so as not to be axially movable with respect to the rotary shaft 12, and can support the rotary shaft 12 such that the rotary shaft 12 is rotatable. The outer ring 34 has a back surface 35*a* having a large radial dimension and a front surface 35*b* having a radial dimension smaller than that of the back surface 35*a*. The rolling bearing 16 is an angular contact ball bearing, and the balls 36 contact a part of the outer raceway surface 38 that is closer to the back surface 35*a* than to the front surface 35*b*.

The second rolling bearing 18 on the second axial side includes an outer ring 44 and balls (rolling elements) 46. An outer raceway surface 48 is provided on an inner periphery of the outer ring 44. The balls 46 are in rolling contact with the outer raceway surface 48. The outer ring 44 is fitted to the inner peripheral surface 15 of the housing 14 with a (small) gap therebetween. In the present embodiment, an inner raceway surface 50 is directly provided on the outer periphery of the rotary shaft 12. The balls 46 are in rolling contact with the inner raceway surface 50. Thus, the rolling bearing 18 is provided in the housing 14 so as not to be axially movable with respect to the rotary shaft 12, and can support the rotary shaft 12 such that the rotary shaft 12 is rotatable. The outer ring 44 has a back surface 45*a* having a large radial dimension and a front surface 45*b* having a radial dimension smaller than that of the back surface 45*a*. The rolling bearing 18 is an angular contact ball bearing, and the balls 46 contact a part of the outer raceway surface 48 that is closer to the back surface 45*a* than to the front surface 45*b*.

The outer ring spacer 20 is interposed between the outer rings 34 and 44 of the pair of rolling bearings 16 and 18. The rolling bearings 16, 18 are arranged such that the back surfaces 35*a*, 45*a* of the outer rings 34, 44 respectively provided on both axial sides face each other. Thus, in the rolling bearings 16, 18 respectively provided on both axial sides, the direction in which the outer raceway surface 38 and the balls 36 contact each other and the direction in which the outer raceway surface 48 and the balls 46 contact each other are opposite to each other in the axial direction. With this configuration, the rolling bearing device 10 can support both of a load acting in a first axial direction and a load acting in a second axial direction.

The elastic member 22 is formed by a spring. The elastic member 22 is provided in the second axial side of the housing 14, that is, in the bottom side (the bottom portion 32-side) of the housing 14. A circumferential groove 52 is provided in the first axial side of the housing 14, that is, on an inner periphery in the opening side of the housing 14. The circumferential groove 52 is a groove continuous in the circumferential direction. The retaining ring 24 is fitted into the circumferential groove 52. The retaining ring 24 axially contacts the outer ring 34 (front surface 35*b*) of the rolling bearing 16 on the first axial side. The elastic member 22 is interposed between a part (the bottom portion 32) of the housing 14 and the outer ring 44 of the rolling bearing 18 on the second axial side, and is compressed in the axial direction. Therefore, the rolling bearings 16, 18, the outer ring spacer 20, and the rotary shaft 12 are urged toward the first axial side by the elastic member 22.

Figure 2:
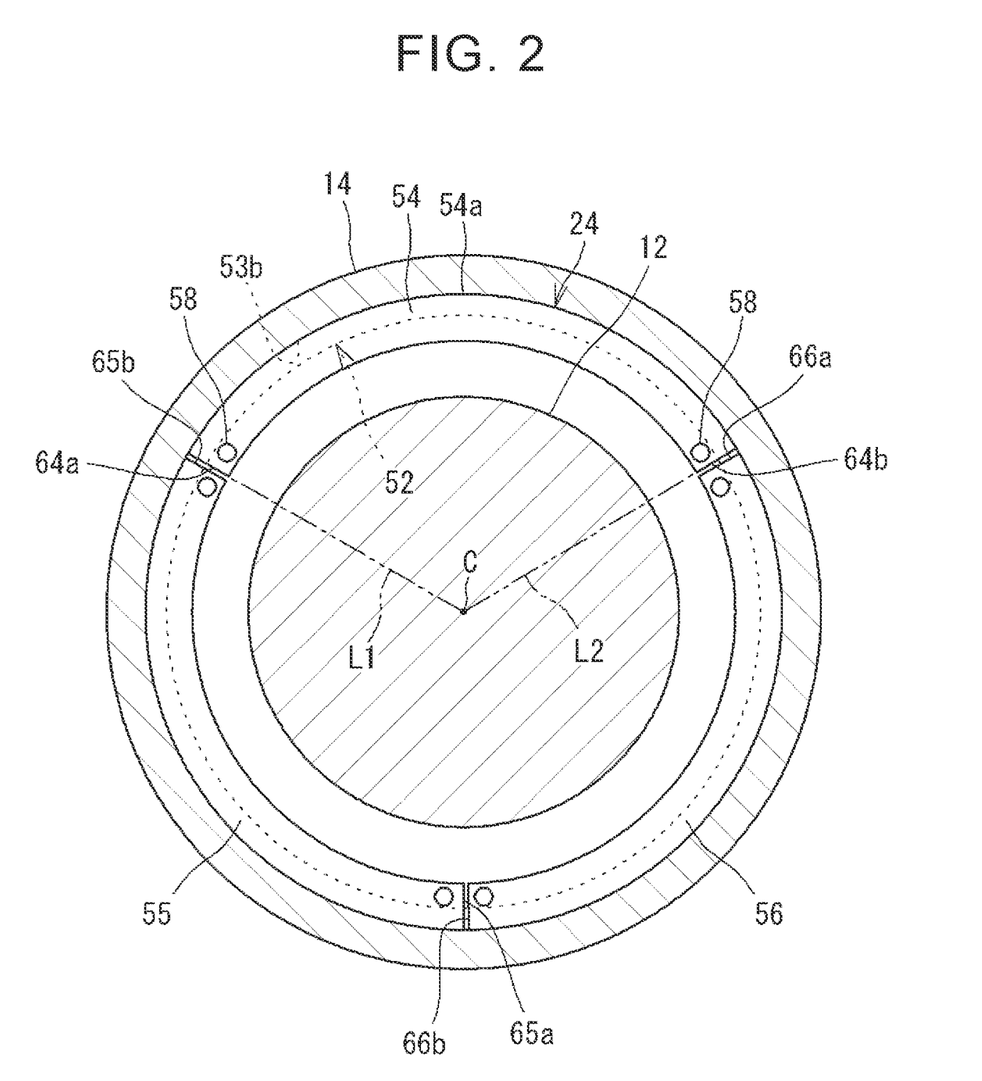
FIG. 2 is a view of a housing, a rotary shaft, and a retaining ring as viewed in an axial direction.

The retaining ring 24 has an annular shape around the center line C, and includes at least three arc members arranged in the circumferential direction. In the present embodiment, as shown in FIG. 2, the retaining ring 24 is constituted by three arc members 54, 55, 56. Each of the arc members 54, 55, 56 is flat and has an arc shape. FIG. 2 shows a state in which the three arc members 54, 55, 56 are arranged to define an annular shape and fitted into the circumferential groove 52. Assembly of the rolling bearing device 10 is completed in this state.

As shown in FIG. 2, the arc members 54, 55, 56 are arranged in the circumferential direction without overlapping each other in the axial direction. The arc members adjacent to each other in the circumferential direction, that is, for example, the arc members 54, 55, may be arranged in a state in which their circumferential end surfaces 64*a*, 65*b* contact each other. In the present embodiment shown in FIG. 2, the arc members 54, 55 adjacent to each other in the circumferential direction are arranged such that there is a (small) gap between the end surfaces 64*a*, 65*b*.

The circumferential groove 52 is formed to have an annular shape around the center line C. In a state where the arc member 54 is fitted into the circumferential groove 52 and a radially outer surface 54*a* of the arc member 54 is in contact with a groove bottom surface 53*b* of the circumferential groove 52, the circumferential end surfaces 64*a*, 64*b* of the arc member 54 coincide with virtual radial lines L1, L2 that pass through the center line C. Holes 58 are provided at opposite circumferential ends of the arc member 54. The three arc members 54, 55, 56 all have the same contour shape and the same thickness. However, the contour shapes of the arc members 54, 55, 56 need not be the same.

Figure 3:
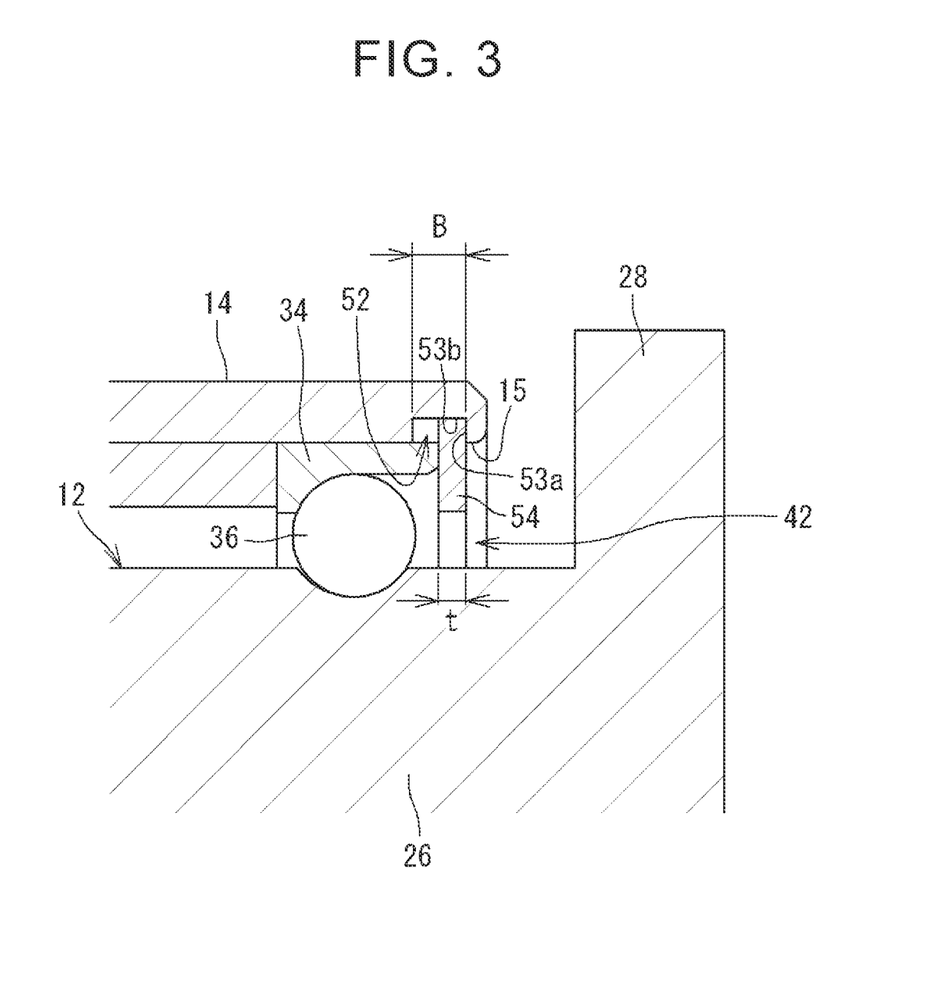
FIG. 3 is an enlarged view of an opening side of the housing.

FIG. 3 is an enlarged view of the opening side of the housing 14. The circumferential groove 52 is provided on the inner periphery of the housing 14, more specifically, on the inner periphery in the opening side (first axial side) of the housing 14. In the present embodiment, the diameter of the inner peripheral surface 15 on the first axial side relative to the circumferential groove 52 is the same as the diameter of the inner peripheral surface 15 on the second axial side relative to the circumferential groove 52.

An axial width dimension B of the circumferential groove 52 is larger than twice a thickness t of a single arc member (for example, arc member 54) (B>2t). In the present embodiment, the width dimension B is smaller than three times the thickness t (B<3t). Thus, the state where two arc members (for example, arc members 54, 55) are housed in the circumferential groove 52 while overlapping each other (see FIG. 8) is conceivable. As will be described later, the two arc members 54, 55 overlap each other while the rolling bearing device 10 is assembled (or disassembled), and the arc members (54, 55) do not overlap each other when the assembly is completed.

Each of the arc members 54, 55, 56 receives a force (hereinafter referred to as "axial force") from the outer ring 34, which acts toward the first axial side, due to an elastic restoring force of the elastic member 22 (see FIG. 1). An outer periphery portion of each of the arc members 54, 55, 56 is fitted into the circumferential groove 52 (see FIG. 2), brought into contact with a groove side surface 53*a* (see FIG. 3) of the circumferential groove 52, and is kept pressing the groove side surface 53*a*, by the axial force. The groove side surface 53*a* is a groove side surface on the first axial side. Thus, the arc members 54, 55, 56 are arranged discontinuously in the circumferential direction, but do not fall off from the circumferential groove 52. That is, the axial force generates a holding force that holds the arc members 54, 55, 56 in the circumferential groove 52.

Here, for example, in the case where the X-ray tube moves while accelerating in the axial direction, the rotary shaft 12 is slightly displaced toward the second axial side due to an influence of inertial force of the target connected to the flange portion 28. Thus, the elastic member 22 is compressed in the axial direction, and the axial force decreases. This decreases the holding force for holding the arc members 54, 55, 56 in the circumferential groove 52. The rolling bearing device 10 according to the present embodiment has a configuration that restrains the arc members 54, 55, 56 from falling off from the circumferential groove 52 even in the above-described case. Hereinafter, the configuration will be described.

Figure 4:
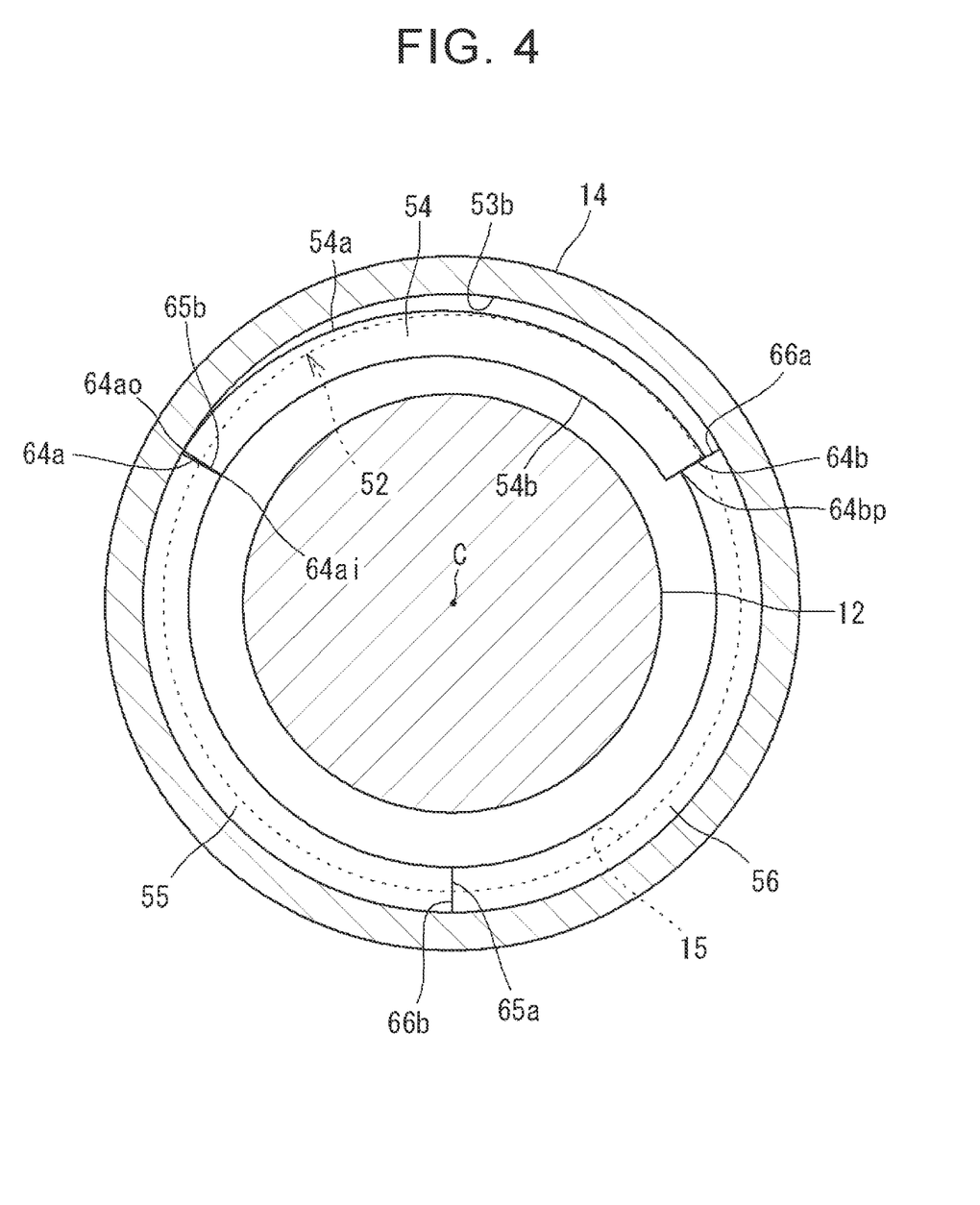
FIG. 4 is a view of arc members fitted into a circumferential groove as viewed in the axial direction.

FIG. 4 is an explanatory diagram showing one arc member 54 fitted into the circumferential groove 52 and the other arc members 55, 56 arranged on both sides of the arc member 54 in the circumferential direction, as viewed in the axial direction. The configuration for restraining the one arc member 54 from falling off from the circumferential groove 52 will be described with reference to FIG. 4. It is assumed that the other arc members 55, 56 are in contact with each other at end surfaces 65a, 66b. As shown in FIG. 4, a part of a first end surface 64a of the one arc member 54, which is located on a first circumferential side, contacts a second end surface 65b of the other arc member 55 in the circumferential direction, and another part of the first end surface 64a of the one arc member 54 contacts the groove bottom surface 53b of the circumferential groove 52. Specifically, an inner peripheral end portion 64ai of the first end surface 64a contacts the second end surface 65b, and an outer peripheral end portion 64ao of the first end surface 64a contacts the groove bottom surface 53b (without contacting the second end surface 65b). In the case where the inner peripheral end portion 64ai is maintained in contact with the first end surface 64a and the outer peripheral end portion 64ao is maintained in contact with the groove bottom surface 53b as described above, when the one arc member 54 is displaced so as to be tilted such that the first end surface 64a-side serves as a support, at least a part 64bp of the second end surface 64b of the one arc member 54, which is located on a second circumferential side, contacts a first end surface 66a of the other arc member 56. Thus, even when the one arc member 54 is displaced as described above, the configuration described above restrains further displacement and falling off of the arc member 54 toward the center line C.

From the above, it can be considered that the arc member 54 is provided as follows. "The one arc member 54 and the other arc members 55, 56 respectively arranged on both sides of the one arc member 54 in the circumferential direction are fitted into the circumferential groove 52, and entire end surfaces 65a, 66a of the other arc members 55, 56 are in contact with each other in the circumferential direction. The shape (circumferential length, shapes of the end surfaces 64a, 64b, etc.) of the one arc member 54 is determined such that, the radially inner side of the first end surface 64a of the one arc member 54, which is located on the first circumferential side, is brought into contact with the second end surface 65b of the other arc member 55 located on the first circumferential side, and the radially outer side of the first end surface 64a of the one arc member 54, which is located on the first circumferential side, is brought into contact with the groove bottom surface 53b. Further, the shape of the one arc member 54 is determined such that in the case where the contact state described above is maintained, when the one arc member 54 is displaced so as to be tilted toward the center line C with the first end surface 64a-side serving as a support, the second end surface 64b of the one arc member 54, which is located on the second circumferential side, contacts the first end surface 66a of the other arc member 56 located on the second circumferential side."

Figure 5:
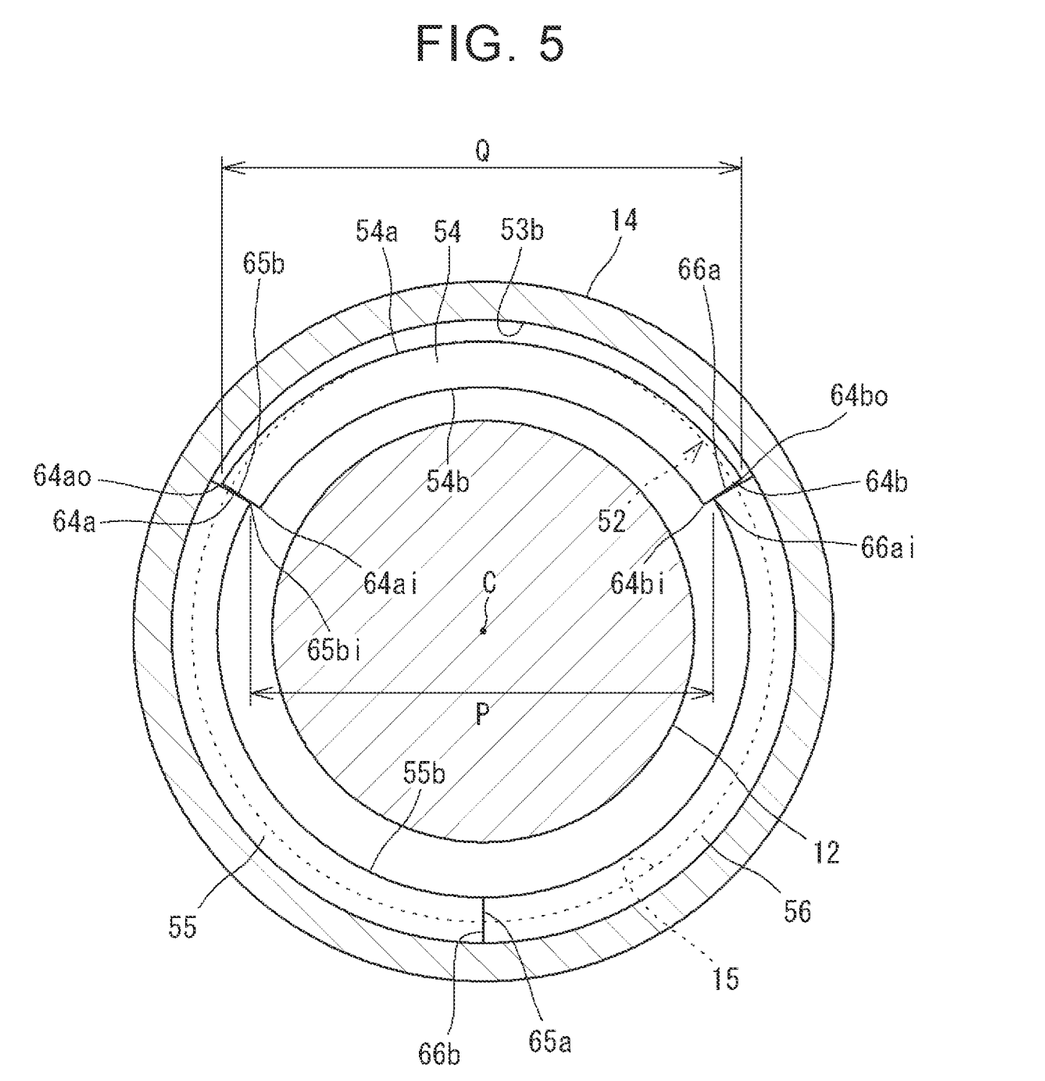
FIG. 5 is an explanatory diagram of the arc members.

In addition to the above situation in which the arc member 54 is tilted such that the first end surface 64a-side serves as a support, examples of the situation in which the arc members 54, 55, 56 fitted into the circumferential groove 52 may move toward the center line C and may fall off from the circumferential groove 52 include a situation in which the arc member 54 moves in parallel toward the center line C as shown in FIG. 5. In the case of FIG. 5, the upper arc member 54 moves downward in parallel. In this case, the shape of the arc member 54 required for restraining the arc member 54 from falling off from the circumferential groove 52 is as follows.

In FIG. 5, it is assumed that the other arc members 55, 56 respectively arranged on both sides of the one arc member 54 in the circumferential direction are in contact with each other at the end surfaces 65a, 66b. When these other arc members 55, 56 are regarded as one set, a linear distance between corners (65bi, 66ai) on both ends of the one set along an inner periphery of the one set is defined as "P". A linear distance between corners (64ao, 64bo) on both ends of the one arc member 54 along the outer periphery of the one arc member 54 is defined as "Q". In this case, to restrain the arc member 54 from falling off from the circumferential groove 52, the linear distance Q needs to be larger than the linear distance P (Q>P).

That is, it can be considered that the arc member 54 is provided as follows. "The shape (circumferential length, shapes of the end surfaces 64a, 64b, etc.) of the one arc member 54 is determined such that, in the case where the one arc member 54 and the other arc members 55, 56 respectively arranged on both sides of the one arc member 54 in the circumferential direction are fitted into the circumferential groove 52 and the other arc members 55, 56 are regarded as one set, the linear distance Q between the corners (64ao, 64bo) on both ends of the one arc member 54 along the outer periphery of the one arc member 54 is larger than the linear distance P between the corners (65bi, 66ai) on both ends of the one set along the inner periphery of the one set (Q>P)."

The corners (64ao, 64bo) and the corners (65bi, 66ai), etc. will be supplementarily described. In the arc member 54, the outer peripheral end portion 64ao of the first end surface 64a has an angular shape in which the first end surface 64a and the radially outer surface 54a intersect each other, and thus can be referred to as a corner (64ao). Similarly, the outer peripheral end portion 64bo of the second end surface 64b of the arc member 54 can be referred to as a corner (64bo). Further, in the other arc member 55, the inner peripheral end portion 65bi of the second end surface 65b has an angular shape in which the second end surface 65b and the radially inner surface 55b intersect each other. Thus, the inner peripheral end portion 65bi can be referred to as a corner (65bi). Similarly, in the other arc member 56, the inner peripheral end portion 66ai of the first end surface 66a can be referred to as a corner (66ai).

As will be described later, to fit each of the arc members 54, 55, 56 into the circumferential groove 52, it is necessary to insert the arc members 54, 55, 56 sequentially toward the circumferential groove 52 through an annular space 42. The annular space 42 is defined between the rotary shaft 12 (see FIG. 1) and the inner peripheral surface 15 of the housing 14, more specifically, the inner peripheral surface 15 in the opening side of the housing 14. Thus, each of the arc members 54, 55, 56 needs to pass through the annular space 42, and thus has a shape that can pass through the annular space 42. The shape will specifically be described below. The arc members 54, 55, 56 are all assumed to have the same shape. Here, the arc member 54 will be described.

Figure 6:
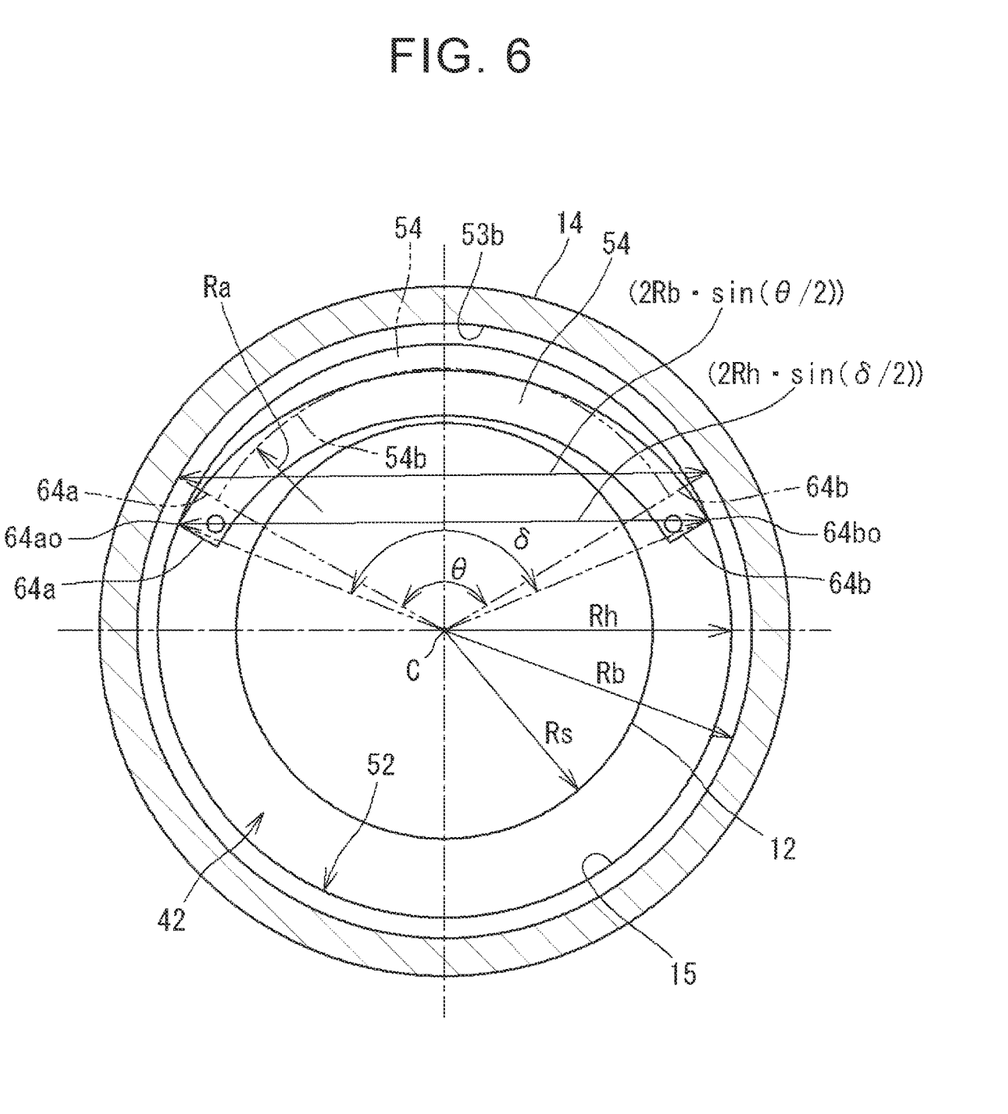
FIG. 6 is an explanatory diagram of the arc members.

In FIG. 6, a radius of the rotary shaft 12 (shaft body portion 26) is referred to as "Rs", a radius of the inner peripheral surface 15 in the opening side of the housing 14 is referred to as "Rh", and a radius of the groove bottom surface 53b of the circumferential groove 52 is referred to as "Rb". The arc member 54 has a shape that satisfies the following expressions (1), (2), and (3). Note that "Ra" in the expressions represents a radius of a radially inner surface 54b of the arc member 54. A symbol "θ" represents an angle defined by a first imaginary line and a second imaginary line. The first imaginary line and the second imaginary line respectively pass through the first end surface 64a and the second end surface 64b of the arc member 54 that is fitted into the circumferential groove 52 (shown by an alternate long and two short dashed line in FIG. 6) and pass through one point on the center line C.

$$2Rb \cdot \sin(\theta/2) \leq 2Rh \quad (1)$$

A symbol "δ" in FIG. 6 represents an angle defined when the arc member 54 is provided in the annular space 42 before being fitted into the circumferential groove 52 (as shown by a solid line in FIG. 6). The angle is defined by a third imaginary line and a fourth imaginary line, when it is assumed that the outer peripheral end portion 64ao of the first end surface 64a and the outer peripheral end portion 64bo of the second end surface 64b are on a virtual circle with the radius Rh. The third imaginary line passes through the outer peripheral end portion 64ao and one point on the center line C. The fourth imaginary line passes through the outer peripheral end portion 64bo and one point on the center line C. That is, expression (2) is defined.

$$2Rb \cdot \sin(\theta/2) = 2Rh \cdot \sin(\delta/2) \quad (2)$$

Using an angle δ that satisfies expression (2), it is necessary to satisfy expression (3).

$$Rb \cdot \cos(\theta/2) - Rb \cdot \cos(\delta/2) \leq Ra - Rs \quad (3)$$

When the arc member 54 has a shape satisfying the above expressions with respect to the dimensions of the rotary shaft 12 and the housing 14, the arc member 54 can be inserted into the circumferential groove 52 through the annular space 42, and then can be fitted into the circumferential groove 52.

Figure 7:
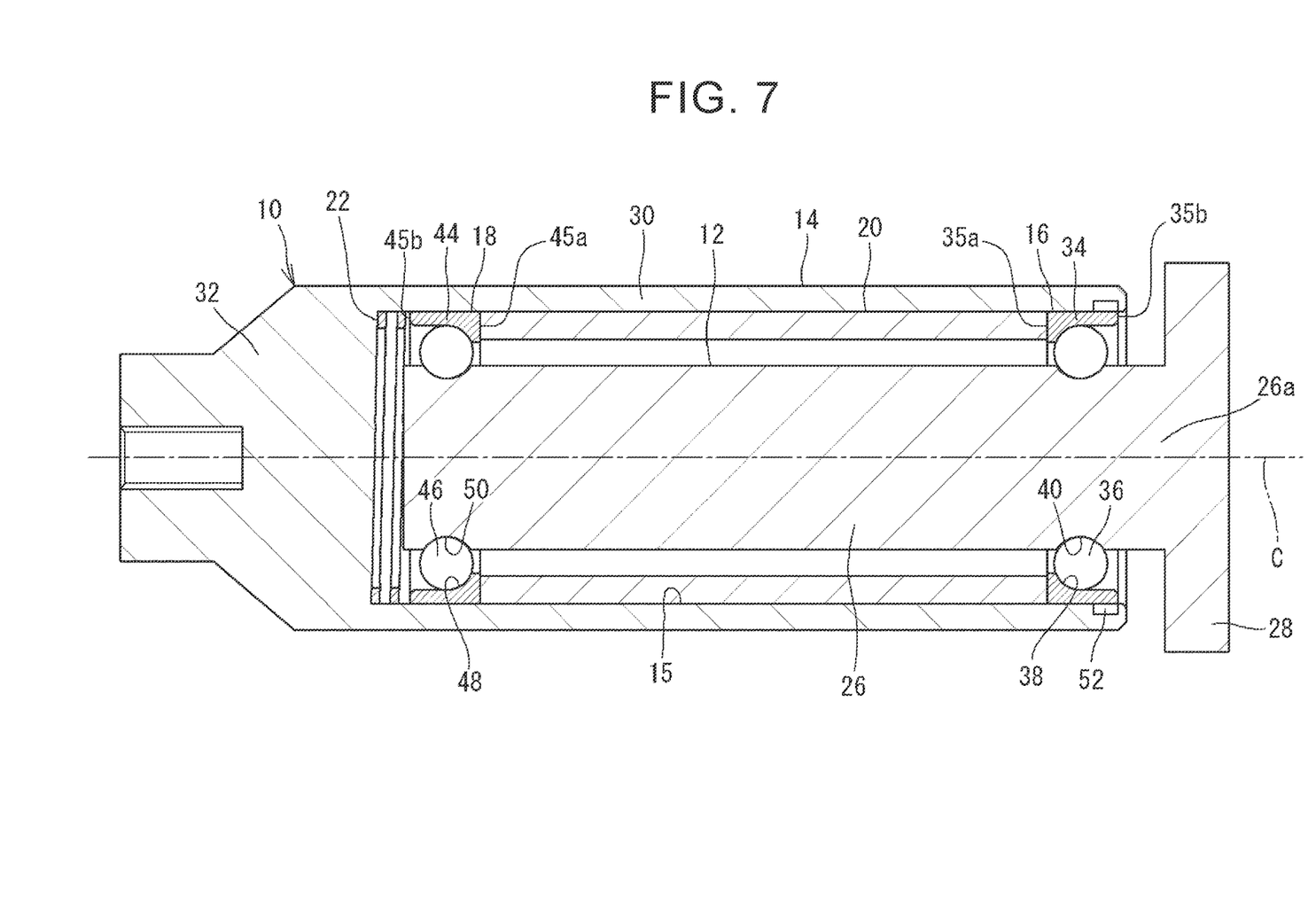
FIG. 7 is an explanatory diagram of an assembling method for the rolling bearing device.

An assembling method for the rolling bearing device 10 (see FIG. 1) having the above configuration will be described. First, as shown in FIG. 7, the elastic member 22 is housed in the housing 14 in a state where the retaining ring 24 (the arc members 54, 55, 56) is not fitted into the circumferential groove 52, and further, as a bearing unit, the pair of rolling bearings 16, 18, the outer ring spacer 20, and the rotary shaft 12 are housed in the housing 14. In this state, a part or all of the circumferential groove 52 is covered by the rolling bearing 16. Next, the axial force is applied to the rotary shaft 12 so as to push the rotary shaft 12 toward the second axial side with respect to the housing 14 against the urging force of the elastic member 22 such that the entire circumferential groove 52 is exposed. In this state, the retaining ring 24 is fitted into the circumferential groove 52. Thus, the assembly is completed as shown in FIG. 1.

Figure 8:
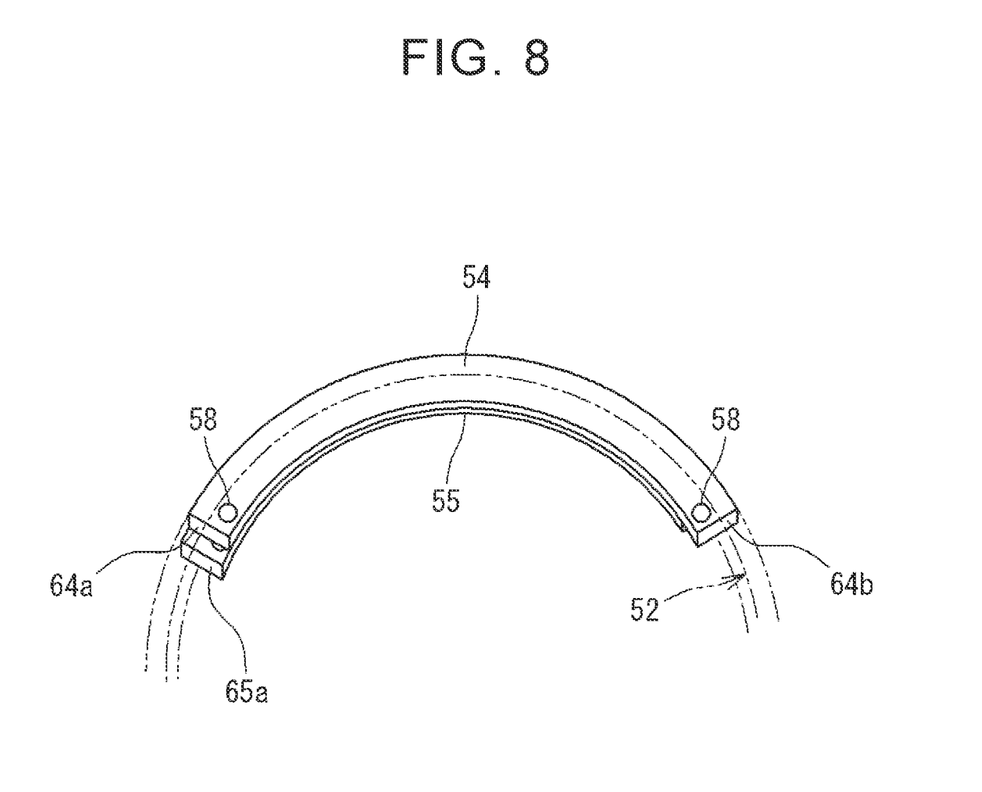
FIG. 8 is an explanatory diagram of a process of fitting the retaining ring into the circumferential groove.
Figure 9:
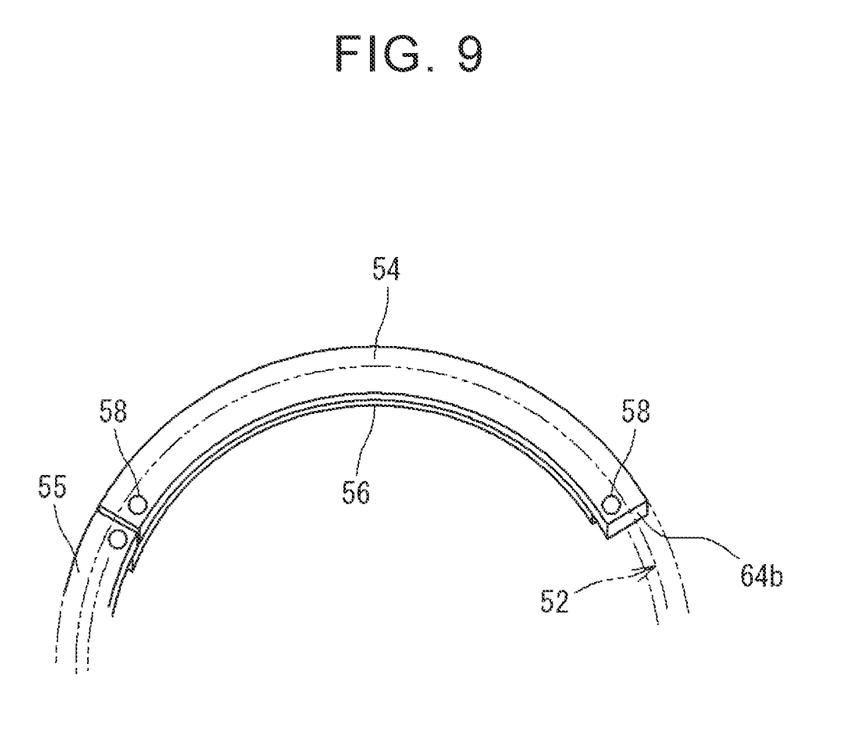
FIG. 9 is an explanatory diagram of a process of fitting the retaining ring into the circumferential groove.

In the process of fitting the retaining ring 24 into the circumferential groove 52, as shown in FIG. 8, the retaining ring 24 is fitted into the circumferential groove 52 such that the two arc members 54, 55 overlap each other. Then, while keeping the one arc member 54 in its position, the other arc member 55 is moved in the circumferential direction (in the counterclockwise direction in FIG. 8). This movement is performed until the one arc member 54 and the other arc member 55 do not overlap each other. Thereafter, as shown in FIG. 9, another arc member 56 is fitted into the circumferential groove 52 so as to overlap the one (or the other) arc member 54 (55). Then, the other arc member 56 is moved in the circumferential direction (in the clockwise direction in FIG. 9) such that the three arc members 54, 55, 56 do not overlap each other. Thus, the three arc members 54, 55, 56 form the annular retaining ring 24 (see FIG. 2), and the application of the axial force is stopped. Thus, the process of fitting the retaining ring 24 into the circumferential groove 52 is completed, and the assembly of the rolling bearing device 10 is completed.

In the present embodiment, as described with reference to FIG. 3, the width dimension B of the circumferential groove 52 is smaller than three times the thickness t of the arc member 54, and the two arc members 54, 55 overlap each other. However, the width dimension B of the circumferential groove 52 may be larger than three times the thickness t. In this case, the three arc members 54, 55, 56 may be fitted into the circumferential groove 52 so as to overlap each other, and the retaining ring 24 may be formed by moving each of the two arc members 55, 56 in the circumferential direction, with respect to the one arc member 54.

As described above, in the process of fitting the retaining ring 24 into the circumferential groove 52, at least two of the three arc members 54, 55, 56 are fitted into the circumferential groove 52 so as to overlap each other. The other arc member 55 (56) is then moved in the circumferential direction with respect to the one arc member 54, and the three arc members 54, 55, 56 are arranged in an annular shape.

The rolling bearing device 10 in the assembled state is disassembled as follows. First, the rotary shaft 12 is pushed toward the second axial side against the urging force of the elastic member 22. Then, the arc members 54, 55, 56 are removed from the circumferential groove 52. This removing operation may be performed by reversing the process of fitting the arc members 54, 55, 56 into the circumferential groove 52 in the assembling method described above. That is, the arc member 56 is moved in the circumferential direction so as to overlap the arc member 54, and the arc members 54, 56 are removed from the circumferential groove 52. Then, the remaining arc member 55 is removed from the circumferential groove 52.

As described above, the operation of fitting the arc members 54, 55, 56 into the circumferential groove 52 and the operation of removing the arc members 54, 55, 56 from the circumferential groove 52 are preferably performed by inserting a tool (not shown) into the holes 58 provided in each of the arc members 54, 55, 56.

As described above, as shown in FIG. 1, the rolling bearing device 10 according to the present embodiment includes the retaining ring 24 that restrains the elastic member 22, the pair of rolling bearings 16, 18, the outer ring spacer 20, and the rotary shaft 12, which are housed in the housing 14, from falling off from the opening side of the housing 14. The retaining ring 24 is fitted into the circumferential groove 52 provided on the inner periphery in the opening side of the housing 14, and axially contacts the outer ring 34 of the rolling bearing 16. As shown in FIG. 2, the retaining ring 24 includes the three arc members 54, 55, 56 arranged in the circumferential direction. Note that the number of the arc members may be other than three, and may be four or more.

According to the rolling bearing device 10 having the above configuration, as described above, after the elastic member 22, the pair of rolling bearings 16, 18, the outer ring spacer 20, and the rotary shaft 12 are housed in the housing 14, the rotary shaft 12 is pushed toward the second axial side against the urging force of the elastic member 22, and the retaining ring 24 is fitted into the circumferential groove 52 in this state. At the time of fitting the retaining ring 24 into the circumferential groove 52, as shown in FIGS. 8 and 9, the plurality of arc members 54, 55 (56) are overlapped and fitted into the circumferential groove 52, and the other arc member 55 (56) is moved in the circumferential direction with respect to the one arc member 54. Thus, the arc members 54, 55, 56 can be arranged in an annular shape and function as the retaining ring 24. Since assembly can be performed in this way, it is not necessary to elastically deform the retaining ring in a direction in which its diameter is reduced, unlike in the related art. This facilitates the operation of fitting the retaining ring 24 into the circumferential groove 52, and as a result, facilitates the assembly of the rolling bearing device 10.

In this embodiment, the arc members 54, 55, 56 have the same thickness.

As shown in FIG. 3, the axial width dimension B of the circumferential groove 52 is larger than twice the thickness t of the single arc member 54 and smaller than three times the thickness t (2t<B<3t). With this configuration, for example, two arc members 54, 55 are overlapped and fitted into the circumferential groove 52, and the other arc member 55 is moved in the circumferential direction with respect to the one arc member 54. This can restrain the axial width dimension B of the circumferential groove 52 from becoming unnecessarily large.

In the present embodiment, as described with reference to FIG. 5, when the two other arc members 55, 56 other than the one arc member 54 are regarded as one set, the linear distance Q between the corners (64ao, 64bo) on both ends of the one arc member 54 along the outer periphery of the one arc member 54 is larger than the linear distance P between the corners (65bi, 66ai) on both ends of the one set along the inner periphery of the one set. With this configuration, even when the axial force applied by the elastic member 22 is weakened and the one arc member 54 is prone to be displaced toward the center line C, the both end surfaces 64a, 64b of the one arc member 54 in the circumferential direction come into contact with the arc members 55, 56 on both sides of the one arc member 54 in the circumferential direction. Therefore, it is possible to restrain the one arc member 54 from falling off from the circumferential groove 52.

Figure 10:
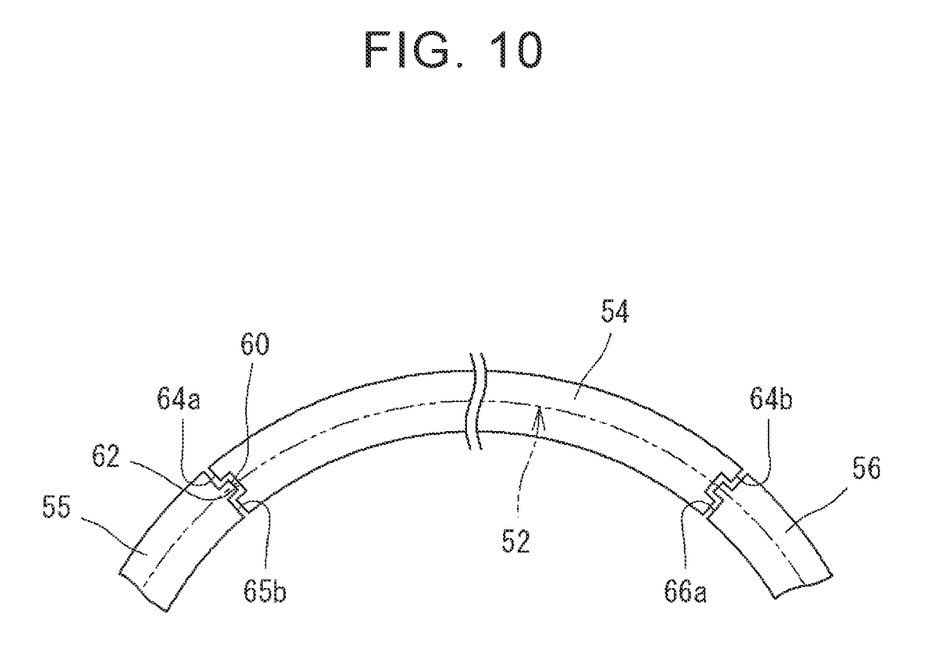
FIG. 10 is an explanatory diagram showing a modification of the arc members.

FIG. 10 is an explanatory diagram showing a modification of the arc members 54, 55, 56. To restrain the arc members 54, 55, 56 from falling off from the circumferential groove 52, the arc members 54, 55, 56 may have the following configuration. The end surfaces of the arc members 54, 55, 56 in the circumferential direction have the recessed and projected shapes (in other words, the end surfaces of the arc members 54, 55, 56 in the circumferential direction have recesses and projections). As shown in FIG. 10, the recessed shape (i.e., the recess) on the first end surface 64a of the first arc member 54 and the projected shape (i.e., the projection) on the end surface 65b of the second arc member 55 adjacent to each other in the circumferential direction mesh with each other, and the recessed shape (i.e., the recess) on the end surface 64b of the first arc member 54 and the projected shape (i.e., the projection) on the end surface 66a of the third arc member 56 adjacent to each other in the circumferential direction mesh with each other. With this configuration, even when the axial force applied by the elastic member 22 is weakened and the one arc member 54 is prone to be displaced toward the center (lower side in the case of FIG. 10), the first end surface 64a of the arc member 54 in the circumferential direction meshes with and contacts the end surface 65b of the adjacent arc member 55 in the circumferential direction, and the end surface 64b of the arc member 54 in the circumferential direction meshes with and contacts the end surface 66a of the adjacent arc member 56 in the circumferential direction. Therefore, it is possible to restrain the one arc member 54 from being largely displaced toward the center, that is, falling off from the circumferential groove 52. Note that the recessed and projected shapes may differ from those shown in FIG. 10. That is, although not shown, a triangular projection (recess) may be employed, instead of a rectangular projection 60 (recess 62).

With reference to FIG. 1, each of the rolling bearings 16, 18 may have an inner ring (not shown) that is a separate member from the rotary shaft 12. In this case, the inner ring is externally fitted and fixed to the rotary shaft 12 such that the rolling bearings 16, 18 are not axially movable with respect to the rotary shaft 12. That is, the rolling bearings 16, 18 can move integrally with the rotary shaft 12 in the axial direction.

The embodiments disclosed herein are illustrative and not restrictive in all respects. The scope of the disclosure is not limited to the embodiments described above, and changes and modifications may be made to the embodiments within the scope of the disclosure.

What is claimed is:

1. A rolling bearing device comprising:
a rotary shaft including a shaft body portion and a flange portion provided closer to a first axial side than the shaft body portion is;
a housing having a bottomed cylindrical shape, the housing being configured to house the shaft body portion;
a pair of rolling bearings provided in the housing so as not to be axially movable with respect to the rotary shaft, the rolling bearings being configured to support the rotary shaft such that the rotary shaft is rotatable;
an outer ring spacer interposed between outer rings of the rolling bearings;
an elastic member provided in a bottom side of the housing, the bottom side of the housing being a second axial side of the housing, and the elastic member being configured to urge the rolling bearings, the outer ring spacer, and the rotary shaft toward the first axial side; and
a retaining ring that is fitted into a circumferential groove provided on an inner periphery in the first axial side of the housing, the retaining ring being in axial contact with the outer ring of the rolling bearing located on the first axial side, and the retaining ring including at least three arc members arranged in a circumferential direction, wherein
an axial width dimension of the circumferential groove is larger than twice a thickness of each of the arc members, and smaller than three times the thickness of each of the arc members.

2. The rolling bearing device according to claim 1, wherein the arc members include one arc member and other arc members that are regarded as one set, and a linear distance between corners of the one arc member on both ends along an outer periphery of the one arc member is larger than a linear distance between corners of the one set on both ends along an inner periphery of the one set.

3. The rolling bearing device according to claim 1, wherein end surfaces of the arc members in the circumferential direction have recessed and projected shapes, and the recessed and projected shapes of the end surfaces of the arc members adjacent in the circumferential direction mesh with each other.

4. An assembling method for the rolling bearing device according to claim 1, the assembling method comprising:
   housing the elastic member, the rolling bearings, the outer ring spacer, and the rotary shaft in the housing; and
   fitting the retaining ring into the circumferential groove in a state where the rotary shaft is pushed toward the second axial side against an urging force of the elastic member,
   wherein fitting the retaining ring into the circumferential groove includes i) inserting at least two of the arc members in the circumferential groove such that the at least two arc members overlap each other, and then moving, with respect to one of the at least two arc members, a rest of the at least three arc members in the circumferential direction, and ii) arranging the at least three arc members in an annular shape.

\* \* \* \* \*